United States Patent [19]

Platzer

[11] Patent Number: 4,752,346
[45] Date of Patent: Jun. 21, 1988

[54] APPARATUS AND METHOD FOR SEPARATING ADHERENT FILMS

[75] Inventor: Stephan J. W. Platzer, Califon, N.J.

[73] Assignee: Hoechst Celanese Corporation, Somerville, N.J.

[21] Appl. No.: 69,912

[22] Filed: Jul. 6, 1987

[51] Int. Cl.⁴ ............................................. B32B 31/18
[52] U.S. Cl. .................................. 156/344; 156/584; 430/253; 430/256; 430/259
[58] Field of Search ................ 156/344, 584; 430/253, 430/256, 259, 263

[56] References Cited

U.S. PATENT DOCUMENTS

| | | | |
|---|---|---|---|
| 2,409,564 | 10/1946 | Heinecke et al. | 430/263 |
| 3,307,950 | 3/1967 | Appelbaum | 430/263 |
| 3,671,236 | 6/1972 | Van Beusekom | 430/257 X |
| 3,721,557 | 3/1973 | Inoue | 430/257 |
| 4,247,614 | 1/1981 | Ohta et al. | 430/79 |
| 4,504,571 | 3/1985 | Yamamura et al. | 430/253 |
| 4,631,110 | 12/1986 | Tsumura et al. | 156/584 |
| 4,670,085 | 6/1987 | van der Meer et al. | 156/584 |

Primary Examiner—Robert A. Dawson
Attorney, Agent, or Firm—Richard S. Roberts

[57] ABSTRACT

An apparatus and method for separating adherent films using a platform with a grounded, electrically conductive surface capable of bearing a sheet material; and a grounded electrically conductive bar over the surface; and at least two pins for maintaining the position of the bar over the platform surface while permitting the passage of a sandwiched sheet material to be peeled apart, between said bar and said surface.

22 Claims, 1 Drawing Sheet

APPARATUS AND METHOD FOR SEPARATING ADHERENT FILMS

BACKGROUND OF THE INVENTION

The present invention relates to an apparatus and method for peeling and separating adherent films. More particularly it relates to the peel development of photosensitive articles useful as color proofing films and printed circuit boards.

Many photosensitive articles are known in the art which are produced according to the "peel apart development" method. Typically, in the production of color proofing films and printed circuit boards, a substrate is first coated with an adherent image-forming material. This material is then covered with a transparent film in a sandwich construction. The construction is then imagewise exposed to actinic radiation through an exposure mask. Such exposure causes an image forming differential adhesion of the photosensitive layer such that part of the image adheres with a greater force to the substrate and part adheres preferentially to the cover film. When the cover film and substrate are "peeled apart" one finds, for example, a positive image reproduction remains on the substate and a negative reproduction appears on the top cover sheet.

In some laminating processes, it is desired to completely transfer a coating from one surface to another surface. For example, one may wish to transfer a colored resinous layer disposed on a substrate onto a receiver sheet. In such cases it is typical to juxtapose the coated substrate to the receiver sheet and pass this sandwich through the nip of a pair of heated laminating rollers under pressure. The substrate and receiver sheet are then peeled apart and the colored resinous layer is found to be transferred from the substrate to the receiver sheet. Those skilled in the art of layer transfer are well aware of the multitude of potential applications for such processes wherein the transferred layer may or may not be photosensitive or colored, and wherein single or plural layers are used and wherein full layers or differential images are actually transfered. Examples of such processes may be found in U.S. Pat. Nos. 3,721,557; 3,671,236; 4,247,614; 2,409,564 and 3,307,950 which are incorporated herein by reference.

One problem with such peel transfer methods is incomplete layer transfer. That is, most of the desired layer is correctly transferred to its desired receptor sheet but wherein there are certain "voids" or defects are produced. In the case of a full layer transfer, this problem manifests itself by a number of holes in the transferred layer. In the case of image transfer of photosensitive materials, cohesive stresses cause a loss of sharp image lines or image materials in nonimage areas or vice-versa.

U.S. Pat. No. 4,504,571 describes the importance of the angle at which the layers are peeled apart and the role such may play in successful layer separation. This reference suggests a peel angle (a) within the range of $0° \leq a \leq 90°$ and teaches one not to use higher peel angles in order to avoid deformations.

It has been found that a significant cause of the aforementioned voids is the production of a static charge during the separation process. The instant invention solves the incomplete separation problem by dissipating electric charge build-up during the peeling operation.

SUMMARY OF THE INVENTION

The invention provides an apparatus for separating adherent films which comprises a platform having a preferably grounded, electrically conductive surface capable of bearing a sheet material on said surface; and a grounded, electrically conductive bar positioned over said surface, and means for maintaining the position of said bar over said surface while permitting the passage of a sheet material between said bar and said surface.

The invention also provides a method for separating a flexible film from a surface which film in adhered to said surface with at least one adherent layer, which method comprises peeling said film from said surface and simultaneously grounding the static charge generated during said peeling step with electrically conductive grounding means.

DETAILED DESCRIPTION OF THE PREFERRED EMBODIMENT

Figure 1:
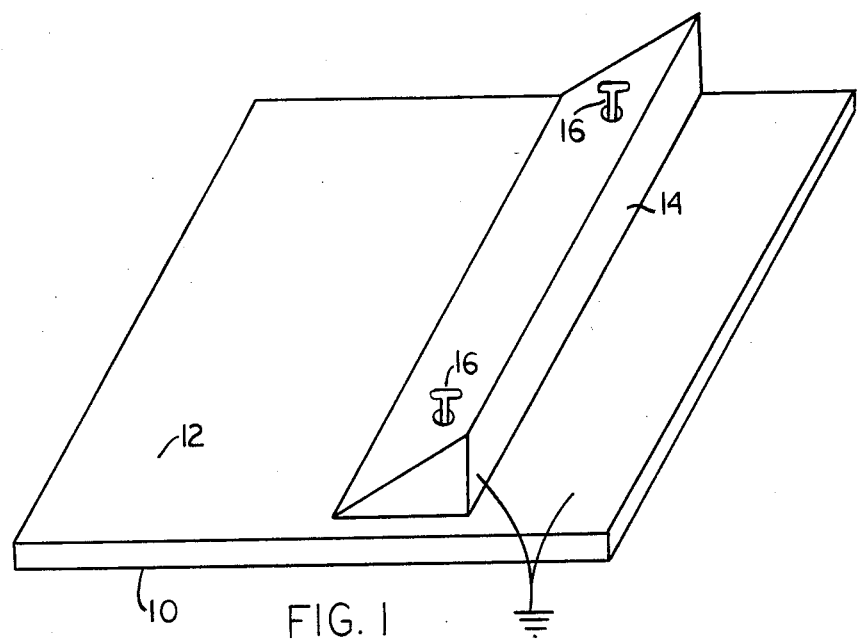
FIG. 1 shows a plan view of one embodiment of the inventive apparatus.

Referring now to FIG. 1, the apparatus comprises a platform member 10 which is either made of a metal or at least has an electrically conductive upper surface 12. Upon the surface is a bar or wedge 14. Both the bar and platform surface are preferably electrically grounded. The bar is positioned over the platform by posts 16 at each end of the bar. The posts are preferably attached through the surface of the platform and extend through holes drilled through the bar such that the bar can move up and down along the posts.

The platform size is preferably between 10 and 80 inches long, between 12 and 30 inches wide, and between ⅛ and 1 inch thick. The platform is preferably made out of a dimensionally stable material, electrically conductive material, such as copper, stainless steel or aluminum. It can also be thermally conductive.

It is preferred to use a thermally conductive material when peel apart at room temperature is to be performed immediately after lamination. This thermal conductivity assists in a quicker reduction of the temperature of the sheet materials which are typically laminated at elevated temperatures.

The bar size is preferably between 12 and 32 inches long, between ½ and 6 inches wide, and between 1/16 and 1 inch thick. The bar is preferably made out of a dimensionally stable, electrically conductive material, such as copper, aluminum or stainless steel. An important feature of the bar is the angle (a) on the peel side is less that about 45°, preferably less than 30°, and most preferably less than 20°. The platform is larger than the bar.

The tension of the bar onto the platform can be regulated by springs, for example, around the pins. The gap between the bar and platform can be regulated if the pins comprise set screws.

Figure 2:
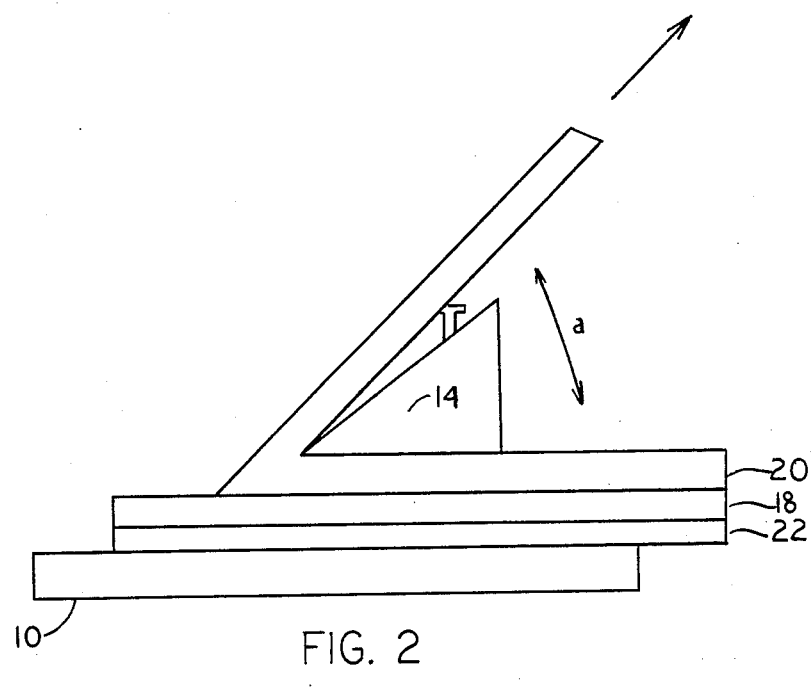
FIG. 2 shows a composite sheet being peeled apart using the inventive apparatus.

In one application, as shown in FIG. 2, adhesive and colored photosensitive layer shown as 18 are coated on a transparent polyester sheet 20. The coated sheet is placed on a receiver sheet 22 and this sandwich construction is passed through the nip of a pair of laminating rollers.

The composite is then inserted between the bar 14 and platform 10 of the peel apparatus. The sheet is manually or automatically wrapped around the low bar angle (a) and pulled. This separates the transparent sheet from the receiver sheet with a transfer of the adhesive and colored, photosensitive layers from the photosensitive element to the receiver sheet. It has been found that if the apparatus is not used, a greater static charge is made and a greater amount of color material remains on the temporary support.

The apparatus can be used with any material which consists of a layer in contact with a flexible layer. The apparatus improves the separation of the two layers.

In the practice of the method of this invention, the receiver surface may comprise any suitable material such as polymeric materials including polyesters and cellulosic materials, inorganic materials including aluminum plates or silicon. The flexible film may likewise comprise flexible polymeric materials and is preferably transparent. The adherent layer may actually comprise a plurality of layers. One or more of such layers may comprise such materials as heat or pressure sensitive adhesives, binding resins, colorants and such photosensitive materials as photopolymerizable compositions, photohardenable compositions, o-quinone diazides and diazonium salts in quantity amounts well known to the skilled artisan.

While the invention has been described in detail and with reference to specific embodiments thereof, it will be apparent to one skilled in the art that various changes and modifications can be made therein without departing from the spirit and scope thereof.

What is claimed is:

1. An apparatus for separating adherent films which comprises a platform having an electrically conductive surface capable of bearing a sheet material on said surface; and a grounded, electrically conductive bar positioned over said surface; and means for maintaining the position of said bar over said surface while permitting the passage of a sheet material between said bar and said surface.

2. The apparatus of claim 1 wherein said surface is substantially flat.

3. The apparatus of claim 1 wherein said bar is a wedge.

4. The apparatus of claim 3 wherein said wedge forms an angle with said surface of about 45° or less.

5. The apparatus of claim 3 wherein said wedge forms an angle with said surface of about 30° or less.

6. The apparatus of claim 3 wherein said electically conductive surface is grounded.

7. The apparatus of claim 1 wherein said means for maintaining the position of said bar over said surface comprises at least two pins mounted perpendicularly to said surface and extending through said bar wherein said bar is capable of motion along the direction of said pins.

8. The apparatus of claim 7 wherein said pins comprise screws capable of regulating the distance between said bar and said platform.

9. The apparatus of claim 7 further comprising springs positioned around said pins.

10. An apparatus for separating adherent films which comprises a substantially flat platform having an electrically conductive surface capable of bearing a sheet material on said surface; and a grounded, electrically conductive wedge positioned over said surface wherein said wedge forms an angle with said surface of about 45° or less; and means for maintaining the position of said wedge over said surface while permitting the passage of a sheet material between said wedge and said surface, which means comprises at least two pins mounted perpendicularly to said surface and extending through said wedge wherein said wedge is capable of motion along the direction of said pins.

11. The apparatus of claim 10 wherein said angle is about 30° or less.

12. The apparatus of claim 10 wherein said electrically conductive surface is grounded.

13. The apparatus of claim 10 wherein said pins comprise screws and said apparatus further comprises springs positioned around said screws.

14. A method for separating a flexible film from a surface which film is adhered to said surface with at least one adherent layer, which method comprises peeling said film from said surface and simultaneously grounding the static charge generated during said peeling step with electrically conductive grounding means.

15. The method of claim 14 wherein said flexible film and said surface comprise materials selected from the group consisting of polyesters, aluminum, silicon, and cellulosic materials.

16. The method of claim 14 wherein said at least one adherent layer contains a colorant.

17. The method of claim 14 wherein said at least one adherent layer comprises a photosensitive composition.

18. The method of claim 14 wherein said at least one adherent layer comprises a thermal adhesive.

19. The method of claim 14 wherein said at least one adherent layer comprises a pressure-sensitive adhesive.

20. The method of claim 16 wherein said at least one adherent layer comprises a colored, photosensitive composition.

21. The method of claim 17 wherein said photosensitive composition comprises one or more compositions selected from the group consisting of photopolymerizable compositions, photohardenable compositions, o-quinone diazides and diazonium salts.

22. The method of claim 14 wherein said flexible film comprises a transparent polyester material, said at least one adherent layer comprises a colorant and a photosensitive composition selected from the group consisting of photopolymerizable compositions, photohardenable compositions, o-quinone diazides and diazonium salts.

* * * * *